United States Patent
Chavira et al.

(12) 
(10) Patent No.: US 9,213,946 B1
(45) Date of Patent: *Dec. 15, 2015

(54) COMPARING MODELS

(71) Applicant: Google Inc., Mountain View, CA (US)

(72) Inventors: Mark Chavira, Playa Vista, CA (US); Joseph Daverin, South Pasadena, CA (US)

(73) Assignee: Google Inc., Mountain View, CA (US)

( * ) Notice: Subject to any disclaimer, the term of this patent is extended or adjusted under 35 U.S.C. 154(b) by 594 days.

This patent is subject to a terminal disclaimer.

(21) Appl. No.: 13/652,926

(22) Filed: Oct. 16, 2012

Related U.S. Application Data

(63) Continuation of application No. 12/420,190, filed on Apr. 8, 2009, now Pat. No. 8,296,257.

(51) Int. Cl.
 *G06F 15/00* (2006.01)
 *G06N 99/00* (2010.01)

(52) U.S. Cl.
 CPC .................................. *G06N 99/005* (2013.01)

(58) Field of Classification Search
 None
 See application file for complete search history.

(56) References Cited

U.S. PATENT DOCUMENTS

| | | | |
|---|---|---|---|
| 7,043,461 B2 | 5/2006 | Kehder et al. | |
| 7,231,393 B1 | 6/2007 | Harik et al. | |
| 7,383,258 B2 | 6/2008 | Harik et al. | |
| 7,877,371 B1 | 1/2011 | Lerner et al. | |
| 8,024,372 B2 | 9/2011 | Harik et al. | |
| 8,296,257 B1 * | 10/2012 | Chavira et al. | 706/62 |
| 2006/0106743 A1 * | 5/2006 | Horvitz | 706/21 |
| 2006/0253274 A1 | 11/2006 | Miller | |
| 2007/0005646 A1 | 1/2007 | Dumais et al. | |

* cited by examiner

*Primary Examiner* — Kakali Chaki
*Assistant Examiner* — Viker Lamardo
(74) *Attorney, Agent, or Firm* — Fish & Richardson P.C.

(57) ABSTRACT

Methods, systems and computer program products for evaluating performance of generative models are disclosed. One method includes providing a base model and a candidate model having observed variables and first and second conceptually related variables related to the observed variables, respectively, receiving observations assigned to a subset of the observed variables, and for each observation, evaluating the observation by the base model to produce a base assessment of the observation, evaluating the observation by the candidate model to produce a second assessment of the observation, determining a similarity measure of the assessment of the observation based on the base and second assessments, and selecting a subset of observations having low similarity measures for use in evaluating performance of the candidate model.

20 Claims, 7 Drawing Sheets

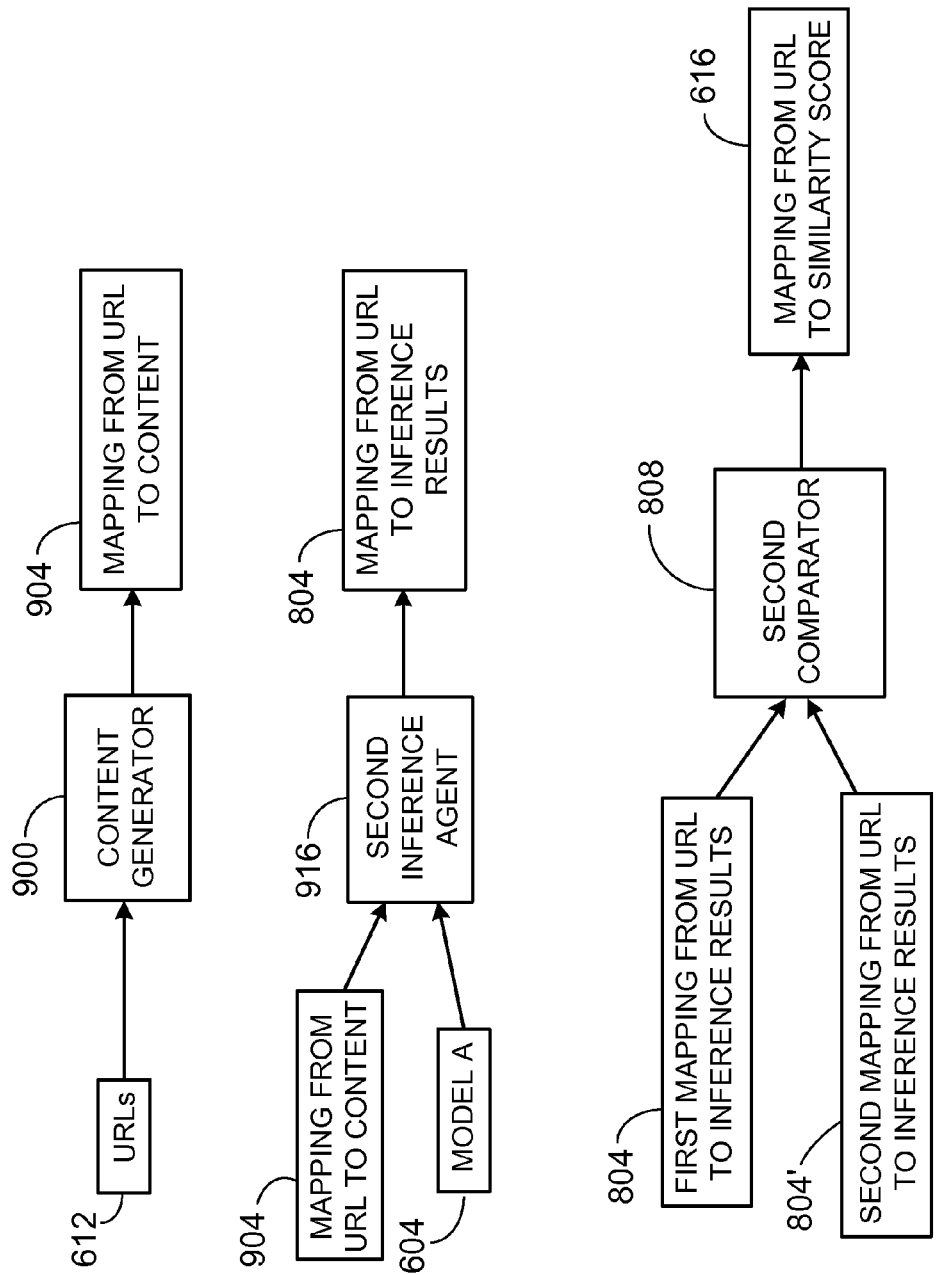

COMPARING MODELS

CROSS-REFERENCE TO RELATED APPLICATIONS

This application is a continuation application of and claims priority to U.S. patent application Ser. No. 12/420,190, titled "COMPARING MODELS," which was filed on Apr. 8, 2009. The disclosure the foregoing application is incorporated herein by reference in its entirety.

BACKGROUND

This disclosure relates to information management.

Generative models and algorithms that act upon generative models are tools of machine learning. A generative model defines a number of variables and describes relationships among the variables. Often, an algorithm that acts upon a generative model endeavors to compute probabilistic information about the values of certain variables given values of other variables.

Generative models can be used to model textual documents in a way that allows an algorithm to provide an underlying meaning for a given piece of text, i.e., the text's semantics. For example, generative models can be used to analyze an original document's semantics to find other documents having similar content to the original document. Similarly, in the context of search engines, a search query entered by a user can be matched to documents in a repository based on the underlying meaning of the search query.

Textual systems based on generative models can learn the generative model (variables and relationships) by, for example, examining many pieces of text from training data. In the context of very large generative models, having many variables and much training data (e.g., millions or billions of text pieces), difficulty may arise in determining whether one generative model is better than another generative model at describing relationships and facilitating algorithms.

SUMMARY

In general, in one aspect, a computer implemented method for evaluating performances of generative models, includes receiving observations associated with observable variables of a first generative model and a second generative model, each of the first and second generative models having information about causal relationships among hidden and observable variables, using at least one computer, for each observation, applying the first model to the observation to produce a first assessment of the observation, applying the second model to the observation to produce a second assessment of the observation, and determining a similarity score between the first and second assessments; and outputting a subset of the observations, each corresponding to first and second assessments, having a similarity score within a predetermined range.

Implementations may include one or more of the following features.

The observable variables can be represented as terminal nodes, and the hidden variables can be represented as cluster nodes. The nodes is coupled together by weighted links, so that if an incoming link from a node that is activated causes a cluster node to activate with a probability proportional to the weight of the incoming link, an outgoing link from the cluster node to another node causes the other node to fire with a probability proportionate to the weight of the outgoing link, otherwise the other node is not activated. The first generative model is trained using a first set of training documents, the second generative model is trained using a second set of training documents, and the second generative model is an updated version of the first generative model. The hidden variables are assigned a distribution of words corresponding to a predetermined concept.

The method can include focusing evaluation of the second model on the assessments corresponding to the subset of observations having a similarity score within the predetermined range. The observations can include textual documents. The observations can include uniform resource locators linking to textual documents. The assessments can include significance measures of the hidden variables. The significance measures can include probabilities associated with the hidden variables. Determining a similarity score can include computing first and second weighted observations based on the first assessment and second assessment, respectively, of the observation, the weighted observations being based on significance measures corresponding to the subset of observed variables. Determining a similarity score can include receiving first and second distributions of words corresponding to a first set of hidden variables and a second set of hidden variables, respectively, and producing a measure of agreement of the first and second distributions of words as the similarity score.

The similarity score can include at least one of the following: a cosine coefficient, a matching coefficient, a dice coefficient, a Jaccard coefficient, or an overlap coefficient. Determining a similarity score can include producing mappings from the observation to the assessments of the observation as intermediate results, and based on the intermediate results, producing a measure of agreement of the assessments as the similarity score. The method can include producing mappings of the observations to content of the observations as first intermediate results, based on the first intermediate results, producing mappings of the observations to assessments of the observations as second intermediate results, and based on the second intermediate results, producing a measure of agreement of the assessments as the similarity score.

In another aspect, a system includes a machine learning module for providing a base model having observed variables and first conceptually related variables related to the observed variables, providing a candidate model having the observed variables and second conceptually related variables related to the observed variables, a comparator for receiving observations assigned to a subset of the observed variables, and for each observation, evaluating the observation by the base model to produce a base assessment of the observation including a subset of the first conceptually related variables, evaluating the observation by the candidate model to produce a second assessment of the observation including a subset of the second conceptually related variables, and determining a similarity measure of the assessment of the observation based on the base assessment and the second assessment, and a sorting module for selecting a subset of observations having similarity scores below a threshold for use in evaluating performance of the candidate model.

Implementations may include one or more of the following features.

The observed variables can be represented as terminal nodes, and the conceptually related variables related to the observed variables are represented as cluster nodes. The nodes are coupled together by weighted links, so that if an incoming link from a node that is activated causes a cluster node to activate with a probability proportional to the weight of the incoming link, an outgoing link from the cluster node to another node causes the other node to fire with a probability proportionate to the weight of the outgoing link, otherwise the other node is not activated. The system can include an input-output device configured to focus human evaluation of the candidate model on the assessments that correspond to the subset of observations and are produced by the candidate models. The assessments include significance measures of the conceptually related variables related to the observed variables.

The significance measures can include probabilities of the conceptually related variables. The sorting module determines the similarity measure by computing first and second weighted observations based on the base assessment and second assessment, respectively, of the observation, the weighted observations being significance measures of the subset of observed variables. The sorting module determines the similarity measure by receiving first and second distributions of words corresponding to the first conceptually related variables and the second conceptually related variables, respectively, and producing a measure of agreement of the first and second distributions of words as the similarity measure.

The system can include an inference agent module for producing a mapping from the observation to the base assessment of the observation and a mappings from the observation to the second assessment of the observation as intermediate results, and a second comparator for producing a measure of agreement of the base and second assessments as the similarity measure based on the intermediate results.

The system can include a content generator for producing mappings of observations to content of the observations as first intermediate results, an inference agent module for producing mappings of observations to assessments of the observations as second intermediate results based on the first intermediate results, and a second comparator for producing a measure of agreement of the assessments as the similarity measure based on the second intermediate results.

Advantages may include one or more of the following. A generative model can be updated and/or evaluated more frequently, with less effort and more accurately.

Other aspects include other combinations of the features recited above and other features, expressed as methods, apparatus, systems, computer-readable media, program products, and in other ways. Other features and advantages will be apparent from the description and from the claims.

DRAWINGS

FIG. 8 is a schematic showing an example content generator for use in a machine learning module

DESCRIPTION

Figure 1:
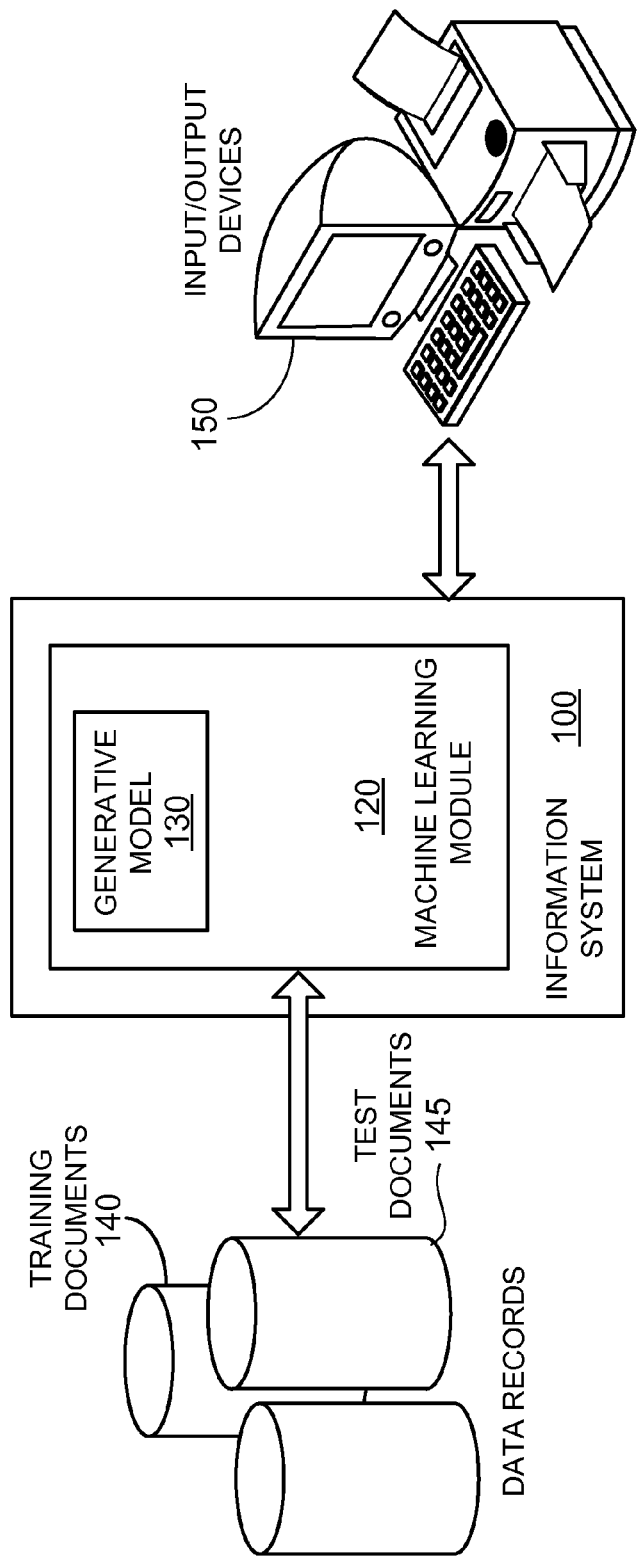
FIG. 1 is a block diagram of an example information system implementing a machine learning module.

Referring to FIG. 1, an example information system 100 includes a machine learning module 120 that can assess the meaning of text using a generative model 130. The generative model 130 can be trained using a set of training documents 140, and updated over time by, for example, using updated training documents 140. Each time the generative model 130 is updated, a human evaluator can examine whether the new generative model 130 performs better than the older version, referred to as the base generative model. Alternatively, an automatic assessment can be performed without human intervention. The set of training documents 140 can include a large number (e.g., billions) of documents, so it may be difficult for the evaluator to determine whether the new model is performing better than the base model if the evaluator had to examine all the training documents and the results from applying the new model to the training documents 140.

To reduce the time needed by the human evaluator to determine the performance of the new model, the information system 100 applies the new and base generative models to test documents 145 to identify test documents 145 that the evaluator needs to manually examine. In some examples, the test documents 145 can be different from the training documents 140, and can be used to evaluate performance of new generative models. As described in detail below, the information system 100 uses a comparator to compare the results from the new and base models to determine test documents 145 for which the new and base models produce similar results (e.g., agree on the meanings of the documents), and test documents 145 for which the new and base models produce different results (e.g., disagree on the meanings of the documents). In some implementations, only test documents 145 for which the new and the base models produce different results are identified.

In some implementations, the evaluator only examines test documents 145 for which the new and base models produce different results, and the corresponding results, to determine whether the new model is better than the base model. This allows new and better versions of the generative model 130 to be released frequently.

The test documents 145 can include textual documents or uniform resource locators (URLs) that link to textual documents in a network (e.g., the World Wide Web). For example, the test documents 145 can include URLs to textual documents that are obtained by sampling a specific number (e.g., 10,0000) of content advertisement URLs on a period basis. The contents of the documents linked to by the URLs can be obtained using, e.g., automated scripts that browse the World Wide Web to create and maintain copies of various web pages. The documents are parsed into fragments for use by the generative model 130. For example, the documents may be converted to UTF8 format and sent to the generative model 130 for further parsing.

When training the generative model 130, a human evaluator may interact with the information system 100 through input/output devices 150. After the generative model 130 is trained, the information system 100 implementing the generative model 130 can be deployed for access by client users (e.g., individual human users, or client programs). Accordingly, in some examples, the information system 100 can be implemented in a client-server model to service client requests.

In some implementations, the generative model 130 is a probabilistic model for generating observable variables based on a set of "hidden" variables. In some examples, the hidden variables can be regarded as "causes" of the observed variables. For example, a simple generative model 130 may include three rules: (1) the probability it is raining outside a building is 0.1, (2) if it is raining outside a building, then the probability that a person walking into the building will be wet is 0.9, and (3) if it is not raining outside the building, then the probability that the person will be wet is 0.1. From inside the building it may not be possible to see outside, so information about whether it is raining outside the building is hidden. However, it may be possible to observe whether people walking into the building are wet. In this example, the generative model 130 includes two variables: a hidden variable "whether-it-is-raining-outside-the-building" and an observable variable "whether-the-person-is-wet."

Given values of some observed variables, the generative model 130 may provide information about likely causes of observed data (e.g., likely values of the hidden variables). In the example above, if a person walking into the building is observed to be wet, the generative model 130 can be used by an algorithm or a computer implementing the algorithm to calculate the probability that it is raining outside the building.

A generative model 130 may include several (e.g., millions or billions) hidden and observable variables. Examples of generative models are described in U.S. Pat. No. 7,231,393, to Harik et. al, the contents of which are incorporated herein by reference. In this description, the term "observation" can refer to an assignment of values to a subset of observable variables, and the term "assessment" can refer to a determination of the causes of the "observation." In some examples, an assessment includes a set of hidden variables, and for each hidden variable in the set, a probability value corresponding to the hidden variable, or a numeric measure indicating the significance of the hidden variable.

In some examples, multiple generative models 130 are created to assess similar observed variables. These models 130 may differ in several ways, e.g., the models may have different causes (i.e., hidden variables) for the observed data, different numbers and types of causal relationships among the hidden and observable variables, and different strengths of the relationships (i.e., probability values corresponding to the hidden variables). For example, a generative model that provides information about the causes for a person walking into the building being wet may include, in addition to the hidden variable indicating whether it is raining outside the building, another hidden variable indicating whether sprinklers outside the building are turned on.

Human evaluators can be employed to determine which of the models 130 is better at producing an assessment for a given observation. For example, to determine which of two models A and B is better, random samples of the observations can be chosen and given to the models A and B. Each of models A and B produces an assessment corresponding to the model's evaluation of the observation. Human evaluators review the assessments to determine which assessment is better. The results for all sampled observations can be aggregated to determine which model is superior. Such an approach can be costly in terms of time and human effort when the generative models 130 each has a very large number (e.g., millions) of variables. Much effort may be wasted because, in many cases, the two models A and B agree on the causes of the observations. It may be more efficient to focus the human evaluator's attention on observations that matter, e.g., observations where the two models A and B disagree on the causes of the observations (e.g., meanings of the documents).

In some implementations, the set of observations chosen randomly for evaluation by the two models A and B may be much larger than a set that is selected for human evaluation. For example, a million or billion of observations can be selected. For each observation, each of the models A and B produces an assessment based on the model's evaluation of the observation. The assessment for model A may include hidden variables that may not exist in model B, and vice versa. Accordingly, additional steps described below may be needed to compare the assessments for models A and B.

In some examples, the model's assessment of an observation is used to generate a probability or other numeric measure for each observed variable in the observation. The probability or other numeric measure is used to compute a "weighted observation" corresponding to each assessment of an observation. Although the models A and B may have different hidden variables and define causal relationships differently, the models A and B may have similar observed variables. Thus, the two weighted observations corresponding to each model can be directly compared.

Many techniques may be used to compare the weighted observations corresponding to each of the models A and B. For example, a "similarity measure" such as a cosine distance measure may be applied to the two weighted observations. This results in a single measure of agreement for each observation that measures how much the two models A and B agree on the assessment corresponding to the observation.

In some examples, as described below, the information system 100 includes a sorting module that sorts the observations according to the similarity measures. Only a portion of the sorted observations are given to the human evaluators. Observations having high similarity measures do not need to be considered by the human evaluators because the two models A and B likely agree on their assessments, and human evaluation will likely not reveal significant differences in the two models A and B. Observations having lower similarity score may be examined by the evaluators because the two models A and B may produce greater differences in their assessments.

In some examples, observations having low similarity measures are uniformly and randomly sampled. For example, a predetermined percentage (e.g., 10%) of observations having low similarity scores may be sampled. These samples can be evaluated by the human evaluators using a shorter amount of time, as compared to performing evaluation on samples chosen from the entire set of observations. In this way, human evaluators can focus their attention on documents on which the two models disagree in meaning, rather than wasting time on documents where the two models agree.

The following describes an example in which the generative model 130 is used by a semantic database server (not shown) that receives input text and outputs an assessment of the text. The input text can be in the form of the training documents 140 having text. The semantic database includes terms (e.g., words or phrases) and clusters of terms, in which each cluster can be regarded as a representation or an identifier for a concept. Associated with each cluster can be a smooth distribution, which is a set of terms that describes the cluster in a human-readable form. In some examples, a smooth distribution can be mapped to multiple clusters. In this example, the semantic database server outputs its assessment of the input text in the form of a set of clusters of terms, and their probabilities, as described below, that indicate the concepts associated with the input text.

In some implementations, the generative model 130 can be based on Bayesian network models (e.g., noisy- or Bayesian network models) that represent terms as nodes in a graph, and associations between terms as edges in the graph. Probabilities or other scores can be assigned to each edge to indicate the degree of relationship between the two nodes associated with the edge. In general, terms connected with edges having higher scores or probabilities have greater semantic similarities (or shorter semantic distances) than terms connected with edges having lower scores.

In some implementations, the semantic database includes predetermined topic clusters, each topic cluster including words or phrases that have certain relationships. Each topic cluster can be identified by a cluster number. Words that are associated with the same cluster numbers are more likely to be related in some way than keywords that do not share any common cluster numbers. Each word can be associated with one or more topic clusters.

When provided with an input word or phrase, the semantic database can provide a cluster vector representing a set of topic clusters (represented by their cluster numbers) associated with the word or phrase, and a set of "activation scores" (or "activation weights"). Each activation score indicates the strength of association between the word or phrase and one of the topic clusters. For example, a phrase "photo pixels" may have a higher activation score with respect to a topic cluster associated with "digital cameras" than a topic cluster associated with "fruits."

The generative model 130 provides information on relationships among words or clusters of words in the semantic database, such as how closely related or opposite they are. In some examples, the model 130 receives text as input, and produces an assessment of the meaning of the text as output. The process of receiving text as input and producing an assessment of the text as output can be referred to as an "inference." For example, the model 130 can be used for selecting advertisements to display on web pages. The model 130 can be used to match ad keywords with keywords found in the web pages so that relevant ads can be displayed on the web pages.

In some implementations, the generative model 130 learns concepts and variables through many small pieces of text that are included in, for example, a training document 140. A small piece of text can include a text segment having a few (e.g., 2-10) words to a paragraph having several words (e.g., 50 or more). The model 130 may consider concepts, as well as information in a small piece of text such as words and compounds used in the text. For example, in the query "cooking classes palo alto," words include "cooking" and "classes," and compounds include "palo alto." Distinguishing compounds from words can be performed, for example, on the basis of compositionality. In some examples, the model 130 simplifies analysis of text by not considering the order of the words in the text. For example, "palo alto classes cooking" is not treated differently from "cooking classes palo alto." Words and compounds can be "terminals nodes" in the model 130, as described below.

Figure 2:
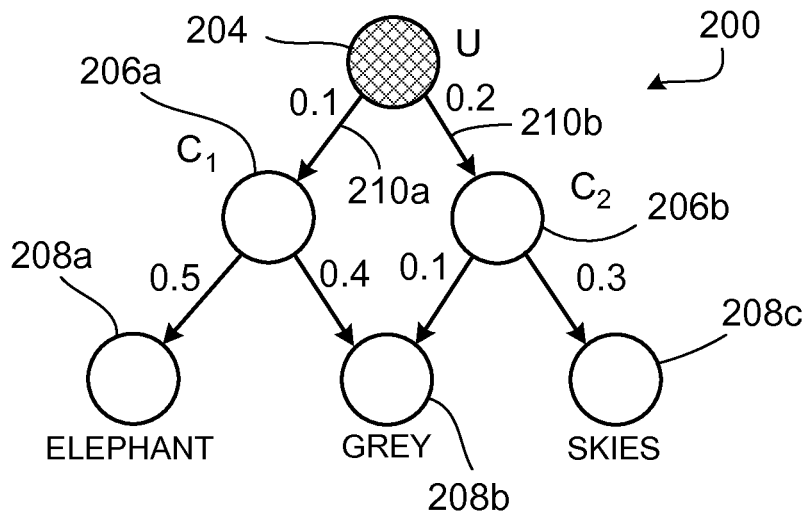
FIGS. 2 and 3 are schematics of example generative models.

Referring to FIG. 2, an example generative model 200 can be represented by a network of model nodes 204-208. Each node represents variables indicating existence or non-existence of concepts (e.g., cluster nodes 206) or terms (e.g., terminal nodes 208). A term can refer to a word or a phrase. In this example, the network includes two concept nodes $C_1$ and $C_2$, and terminal nodes 208 "elephant," "grey," and "skies." Each concept node can be associated with a cluster of terms that are semantically related to the concept represented by the node.

The model 200 may be used to explain, for example, why the words "grey" and "skies" often occur together, or why the words "grey" and "elephant" often occur together, but the words "elephant" and "skies" rarely occur together. When humans generate text with these words, they have ideas or concepts in mind. The model 200 attempts to model the ideas in a human's mind as concepts (represented by concept nodes) and the text generated by humans as terms (represented by terminal nodes).

In this example, node 204 is a universal node U that is always active. When modeling text, node 204 can be regarded as representing all concepts. An arrow pointing from a first node (representing a first concept) to a second node (representing a second concept or a term) represents a link (e.g., 210a or 210b, collectively referenced as 210) that implies when a human thinks of the first concept, he or she is likely to think of the second concept or write the term afterwards. For example, the concept $C_1$ links to the words "elephant" and "grey." This means that after a human thinks of the concept $C_1$, he or she is likely to think of the words "elephant" and/or "grey." The numbers on the links 210 represent probabilities of certain events. The link 210 between $C_1$ and "elephant" means that after thinking of $C_1$, a human is likely to think of the word "elephant" with a probability 0.5, and the link 210 between C1 and "grey" means that after thinking of C1, a human is likely to think of the word "grey" with a probability 0.4. The numbers 0.5 and 0.4 are referred to as "weights" on the links 210.

The model 200 can be used to generate text by starting at the universal node 204, node U, and traversing through the network of model nodes. When the traversal reaches a node 204-208, the node is said to be "active" or has been "fired." The universal node 204 is always active. In some implementations, for concept nodes 206, "firing" means that the concept is active and is able to activate downlink nodes 206 or terminals 208. For terminals, firing means that the terminals 208 exist in the text to be generated.

As an example, consider generating text using the model 200 by starting from the universal node 204. The node $C_1$ will fire with 0.1 probability, or $C_2$ will fire with 0.2 probability. At this point, a random process decides whether or not $C_1$ fires. For this random process, a die can be cast, or any random information can be used to produce a decision to be "no" in 9 out of 10 times (i.e., a probability of 0.9 that $C_1$ does not fire) and "yes" in 1 out of 10 times (i.e., a probability of 0.1 that $C_1$ fires). If the decision is yes, the concept $C_1$ is activated. If the decision is no, the concept $C_1$ is not activated. A similar process may be applied to concept $C_2$. For example, in a computer system, a random number generator can be used in the random process.

Figure 3:
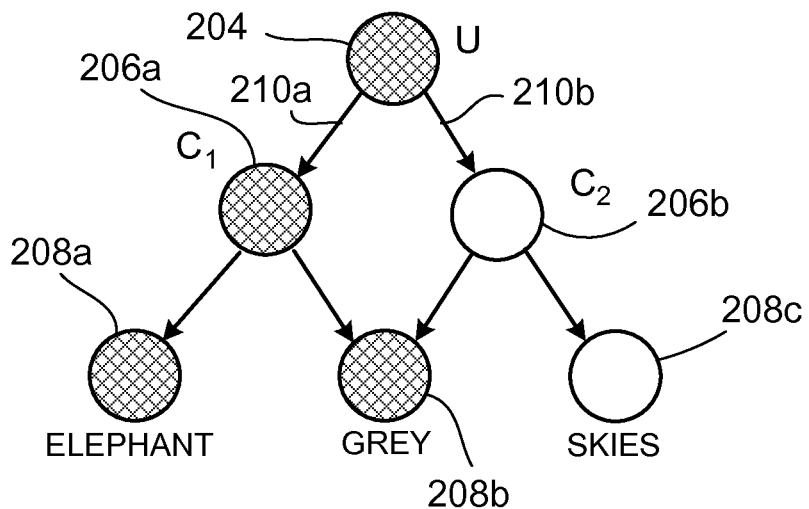

Referring to FIG. 3, in this example, the random number generator produces "yes" for the link 210a and "no" for the link 210b. At this point, node $C_1$ becomes active, as represented by a darkened node. When the concept $C_1$ is active, random numbers may be selected for other concepts or terminals that have links originating from the active concept $C_1$. In this example, the words "elephant" and "grey" have a possibility of becoming active with probabilities of 0.5 and 0.4, respectively. Assuming that more random numbers generators decide that both "elephant" and "grey" are active, as represented by darkened nodes, the model 200 generates a piece of text that includes the words "elephant" and "grey."

The model 200 learns the intermediate concepts, the links, and the link weights to explain the co-occurrence of words and compounds in small pieces of text. The model 200 can be more complicated than the example shown in FIGS. 2 and 3 and can better generate and explain the text of various sizes (for example, while queries are often 2-3 words long, documents can include 1000 words or more).

In some examples, there may be interaction between two or more concepts or clusters trying to fire the same terminal or concept. In such examples, each interaction can be independent of the other. In particular, the probability that the result does not fire is the product of the probability that each cause does not fire it. For example, if three clusters $C_1$, $C_2$, and $C_3$ link to a fourth cluster $C_4$ with weights 0.1, 0.2, 0.3 and $C_1$, $C_2$ and $C_3$ are active, $C_4$ does not fire with probability $(1-0.1)*(1-0.2)*(1-0.3)=(0.9)*(0.8)*(0.7)=0.504$. Consequently, a chance $C_4$ does fire is $1-(1-0.1)*(1-0.2)*(1-0.3)=1-0.504=0.496$.

Figure 4:
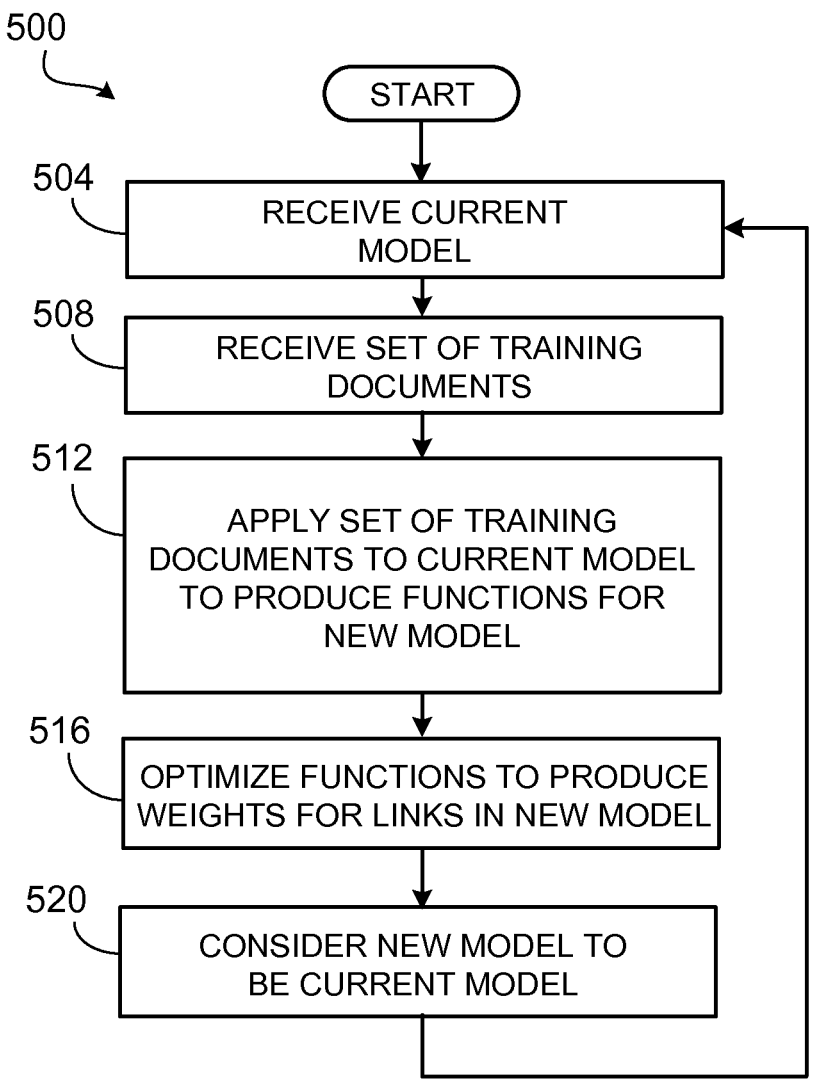
FIG. 4 is a flow chart of an example process implemented by a machine learning module in a computing device, such as the computer system of FIG. 1.

FIG. 4 is a flow chart summarizing an example process 500 for learning the model 200. During the process 500, a current model is received (step 504). If no current model exists, an initial current model is created from a set of words by generating a universal node that is always active, generating terminal nodes representing words in the set of words, and directly linking the universal node with the terminal nodes.

A set of training documents 140 for learning the model 200 is received (step 508). In some examples, the training documents 140 may include the entire, or a subset of, data records 140 (FIG. 1). In some implementations, other sources or text may be employed. For example, as described below, user search queries from a query database may be employed as training data. In some examples, a small set of training documents 140 can be considered for an initial iteration, and then the number of training documents 140 in each subsequent iteration can be increased (e.g., doubled) until all (or a sufficient number of) available training documents 140 are used. This way larger concepts which require fewer training documents 140 to learn can be learned during the earlier iterations.

The set of training documents 140 can then be applied to links defined in the current model to produce functions for corresponding links in a new model (step 512). The functions can be optimized to produce links for weights in the new model (step 516). The new model then can be considered to be the current model and the process 500 is repeated for a number of iterations to produce the generative model 200 that explains the set of training documents 140 (step 520). In some implementations, some or all the steps of the process 500 can be performed by the machine learning module 120.

In some examples, in learning a generative model 200 based on text, various sources of text are selected as training documents. Some factors that may need to be considered include whether the text has related words in close proximity, whether the text presents evidence that is independent, given the model 200, and whether the text is relevant to different kinds of text. In one example, an implementation of the model 200 uses exemplary "query sessions" from a search engine as small pieces of text to learn concepts from the co-occurrence of words and compounds in the query sessions.

An example a query session as described above includes a set of words used by a single user on a search engine for a single day. Often users will search for related material, issuing several queries in a row about a particular topic. Sometimes, these queries are interspersed with random other topics. An example query session (not an actual one) might look as follows:

the graduate
dustin hoffman
rain man
autism
cool junk
fast cars
tom cruise nicole kidman Each query is presented above on a separate line. Most of the words are related in some way. The first is a movie by Dustin Hoffman, as is the third. The second is Dustin Hoffman himself. The fourth deals with an issue brought up in a movie. The fifth query "cool junk" is not related to the main topic of the session, neither is the sixth "fast cars." The last is a little related because Tom Cruise acted in Rain Man with Dustin Hoffman. This example shows that a small piece of text can have a lot of information from which the model 200 can draw conclusions, but the small piece of text can also have a lot of uncorrelated information. One of the tasks of learning the model 200 is to examine a large number (e.g., billions) of such pieces of text and cull out the proper correlations from the uncorrelated information.

Figure 5:
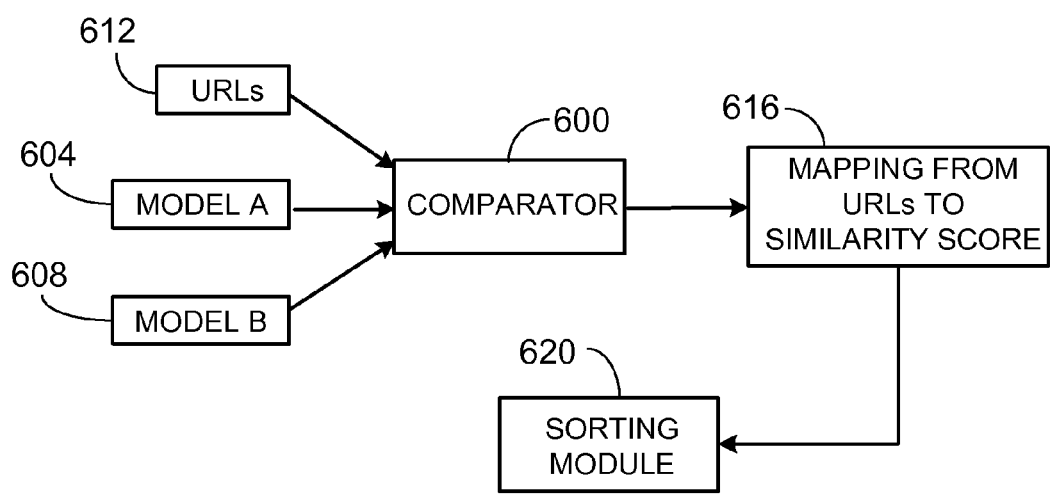
FIG. 5 is a schematic showing an example comparator for comparing generative models.

Referring to FIG. 5, a comparator 600 for comparing generative models 604, 608 (e.g., models A and B) is shown. As described above, a generative model 604 is trained using a set of training documents. Concepts that do not exist in the training data will not be identified by the model 604. However, many concepts become prevalent between training time and inference time, and as such, may not be recognized properly by the model 604. Similarly, a concept in a certain language may not be recognized if the amount of training data for that language was limited. Because of the importance of training data, the model 604 may periodically need to be replaced with a newer version of the model 604 (e.g., model 608). However, the model 608 needs to be evaluated to determine if it is performing assessments better than the model 604. Accordingly, the model 608, as a candidate model, is evaluated against model 604, as the base model, by applying each model 604, 608, to documents identified by a set of uniform resource locators (URLs) 612. The comparator 600 produces mappings from URLs to similarity scores 616 as described below.

A sorting module 620 receives the mappings from URLs to similarity scores 616 as input, and selects a subset of documents having low similarity scores for evaluation (e.g., human evaluation). In some examples, a human evaluator may manually review the mappings from URLs to similarity scores 616 to select the subset of documents having low similarity scores. In some examples, the sorting module 620 sorts the documents by the similarity measures. In some implementations, documents having high similarity measures do not need to be considered by the human evaluators because the base model 604 and the candidate model 608 have a higher level of agreement in their assessments. Documents having lower similarity scores may be scrutinized by the evaluators because the base model 604 and the candidate model 608 have a lower level of agreement in their assessments.

In some implementations, the evaluators may scrutinize documents having a similarity score that falls within a predetermined range (e.g., low scores, but not necessarily the lowest scores). For example, some documents may not have been well understood by either the base model 604 or the candidate model 608 and yet have a lowest similarity score. Accordingly, in some examples, evaluators may choose to ignore documents having lowest similarity scores and focus instead on documents having low similarity scores.

Figure 6:
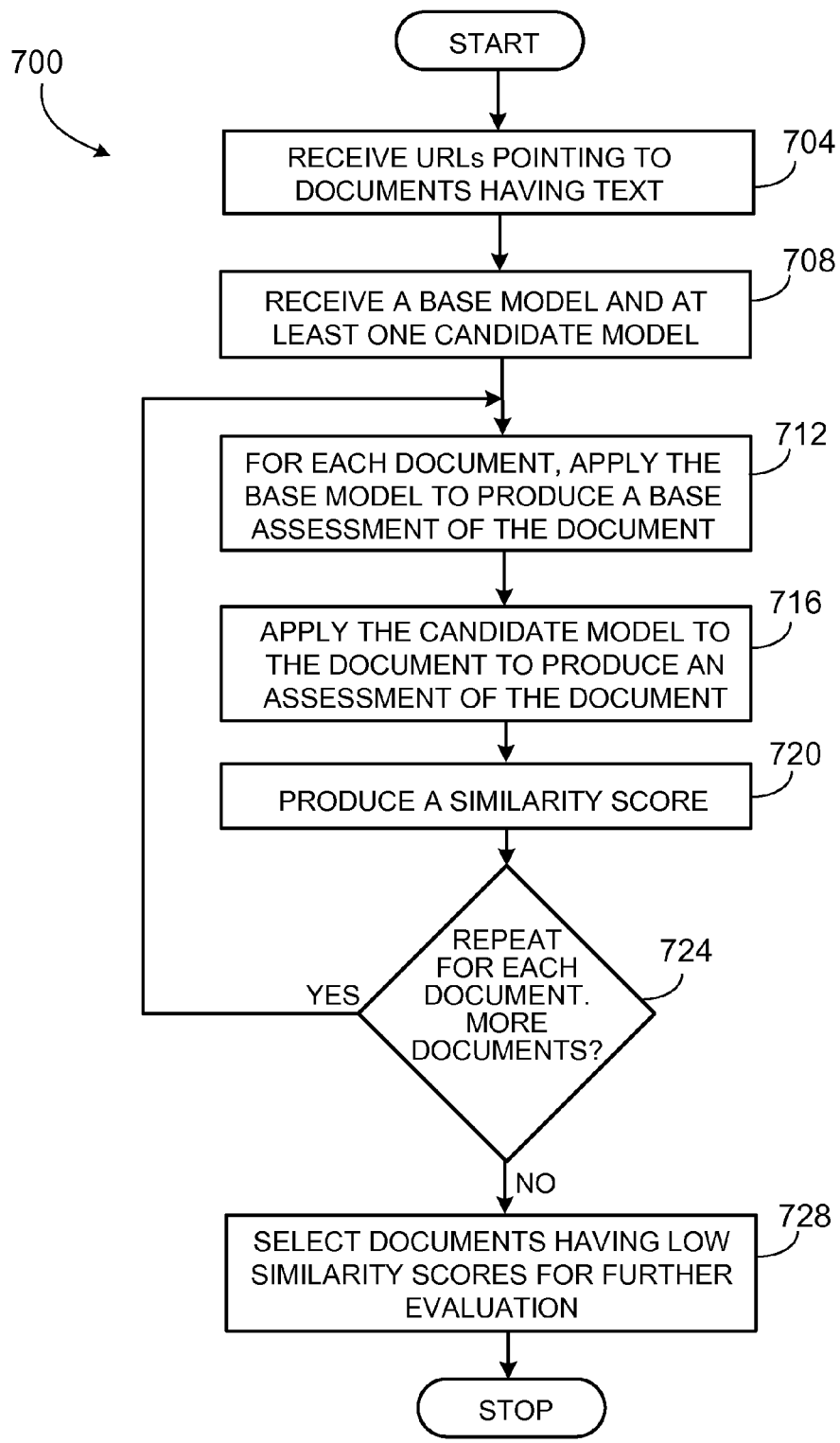
FIG. 6 is flow chart illustrating an example process for comparing generative models implemented in a comparator.

FIG. 6 is a flowchart illustrating an example comparison process 700. In some examples, certain steps 704-728 of FIG. 7 can be carried out using the modules of FIG. 6. For example, the comparison process 700 may be implemented by the comparator 600. A set of URLs pointing to documents having text is received as input (step 704). Also, models, i.e., a base model and at least one candidate model, are received as input (step 708). Each document located at a particular URL is evaluated by using the base model to produce a base assessment of the document (step 712), and by using at least one candidate model to produce an assessment of the document (step 716). As described above, the assessments of the document by the base model and the at least one candidate model can include at least two sets of clusters. Because the models may include different clusters, the two sets of clusters may not be able to be compared directly. Accordingly, each set of clusters is mapped back to a smooth distribution, which can be more readily compared. A smooth distribution of the terms in each set of clusters are retrieved by, for example, taking a union of the smooth distributions corresponding to each cluster in the sets of clusters.

In some examples, different models may use different lexicons, so the terms produced in the smooth distributions may be incompatible. For example, the models can have compounds that are incompatible. Thus, in some implementations, when different lexicons are detected, compounds in the smooth distributions are split prior to computing the similarity score. In some examples, the lexicons are inputs to a model during training. Accordingly, the lexicon associated with a model is known based on information from training the model.

The task of comparing clusters can be reduced to comparing sets of terms. A variety of techniques may be employed to compare the sets of terms. For example, a similarity measure can be produced base on the sets of terms (step 720). A similarity measure may be produced by any of a cosine measure, matching coefficient measure, dice coefficient measure, Jaccard coefficient measure, or overlap coefficient measure. Steps 712-720 are repeated for each URL/document (step 724), and similarity scores are produced in the form of a set of mappings from URLs to similarity scores (step 728). In some examples, specific language statistics can be obtained by augmenting the similarity score for each URL with the language of the corresponding document. For example, one can generate overall statistics and language-specific statistics using a Python script.

Figure 7:
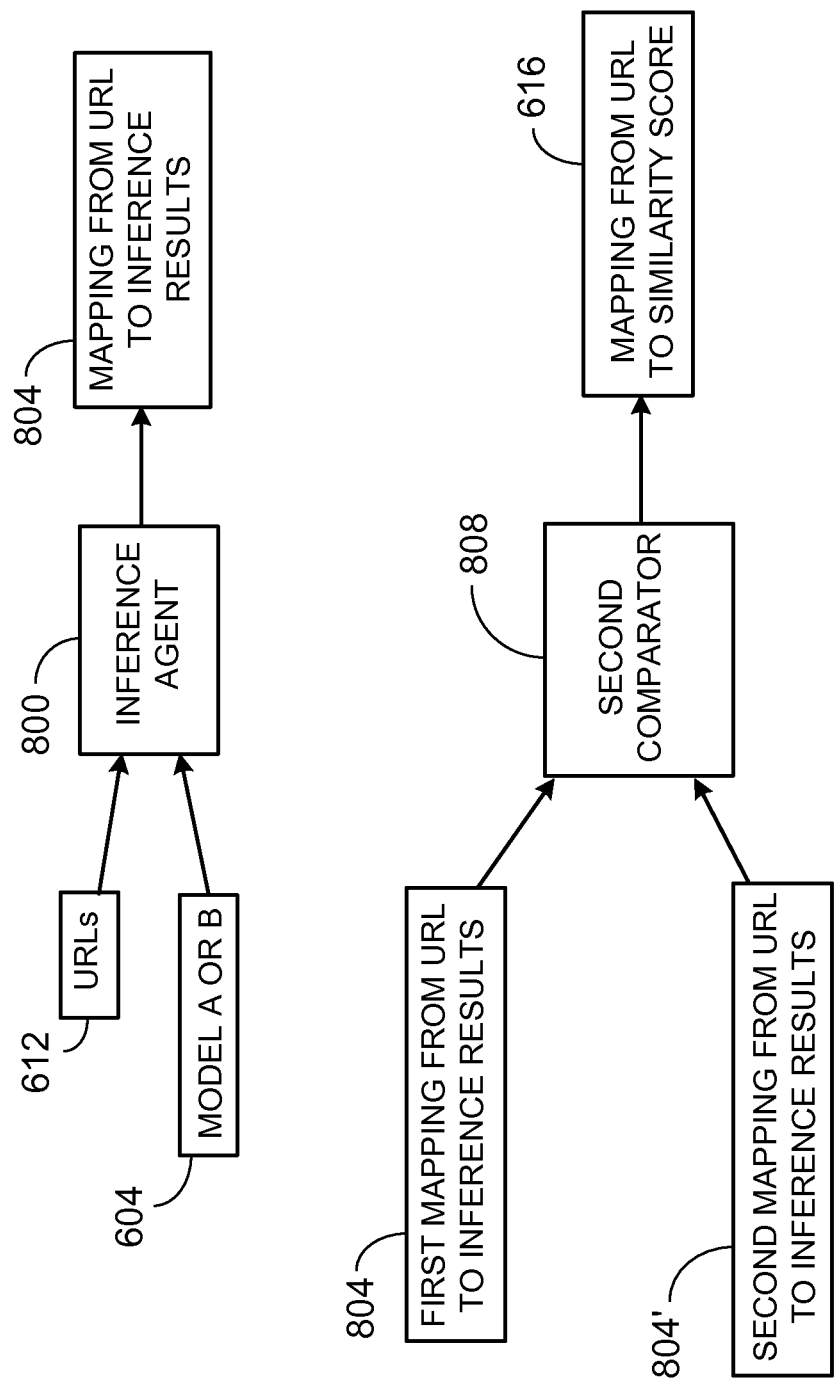
FIG. 7 is a schematic showing an example inference agent for use in a machine learning module.

When comparing a currently deployed base model 604 with several candidate models 608 using, for example, comparator 600 and comparison process 700, the outputs of the base model 604 may need to be sent to the comparator 600 several times. To address this, as shown in FIG. 7, an inference agent module 800, described below, may be introduced to receive the set of URLs 612 and the base model 604 (e.g., model A or B) as input, and to produce, as output, a mapping from the URLs to results of the inference process 804 using the model 604 on the documents identified by the URLs 612. A second comparator 808 may receive two such mappings 804, 804', over similar or like URLs 612 as input, and produce as output the mapping from URLs to similarity scores 616.

The inference agent 800 can receive observations as input and produce assessments as output. As described above, in some examples, observations can include a set of variables, and for each variable in the set, the observations can include corresponding values. For each variable in an observation, additional weights may also be associated with the variable. An assessment can include a set of variables not in the observation, and for each variable, a distribution on its values. For each value of each variable in the assessment, additional weights may also be associated with the value. Each distribution is computed according to the model in such a way that, for each variable in the assessment, its distribution will indicate the probability that the variable will assume each of its values, given the observation.

In some examples, an observation can include a set of terms. As such, the assessment consists of the set of most likely clusters given the observation. In some examples, an assessment can alternatively include clusters that rank highest according to some other measure than probability, such as one based on the associated weights of its values.

The inference agent module 800 allows the machine learning module 120 to compare various candidate models 608 with each other without having the base model 604 be sent many times to a comparator 600. A reduction in a number of times an inference is run can be significant because inferences are generally expensive operations.

In some implementations, the contents of the documents identified by the URLs 612 are constantly changing. As such, the contents of the documents identified by the URLs 612 at a time the inference agent module 800 is run on model 604 may be different from the contents of the documents identified by the URLs 612 at a time the inference agent 800 is run on model 608. Such changes may invalidate results of the comparison.

FIG. 8 shows an example implementation of a content generator 900. As shown, in some implementations, the content generator 900 is introduced to receive a set of URLs as input, and produce a mapping 904 from the URLs to contents of the documents located at the URLs. If documents change, and if the change affect results, then the documents can be cached, so that the original contents can be utilized.

The content generator 900 provides documents for testing or comparing two models 604, 608. In some examples, the test documents 145 used for testing or comparing models 604, 608 do not overlap the training documents 140 used to train any of the models 604, 608 being evaluated. Contents of the documents are extracted and thereby "frozen" by the content generator 900 for comparison over time. For example, even if a document were to change after the inference agent 800 is run on the original contents of the document for the base model 604, the content generator 900 can provide the original contents of the documents to the inference agent 800 for a candidate model 608.

The input/output devices 118 can be constituted by any of a keyboard, a mouse, a liquid crystal display (LCD), a cathode ray tube (CRT) display, or a printer. Various implementations of the machine learning module 120, and various other modules disclosed herein including, but not limited to, comparator 600, inference agent module 800, content generator 900, and sorting module 620 can be realized in digital electronic circuitry, integrated circuitry, specially designed ASICs (application specific integrated circuits), computer hardware, firmware, software, and/or combinations thereof. The various method steps described above can be performed on one or more implementations of, for example, the machine learning module 120. These various implementations can include implementation in one or more computer programs that are executable and/or interpretable on a programmable system including but not limited to at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including but not limited to a machine-readable medium that receives machine instructions as a machine-readable signal. The term "machine-readable signal" refers to any signal used to provide machine instructions and/or data to a programmable processor.

To provide for interaction with a user, the machine learning module 120 can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including but not limited to acoustic, speech, or tactile input.

The machine learning module 120 can be implemented in a computing system 100 that includes a back end component (e.g., as a data server), or that includes a middleware component (e.g., an application server), or that includes a front end component (e.g., a client computer having a graphical user interface or a Web browser through which a user can interact with an implementation of the machine learning module 120), or any combination of such back end, middleware, or front end components.

The components of the system 100 can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Other embodiments are within the scope of the following claims. The methods and systems described herein to evaluate changes to pruning code in the machine learning module 120. If the machine learning module 120 is changed in any way, or if the input to, or other variables of, the module 120 are changed, then the methods and systems can be used to evaluate the changes. The models in modules being compared may include, among others, a training algorithm, training data, and an inference algorithm. In some examples, the methods and systems described herein can be used to evaluate a first model and a second model that are first and second versions of a model and are different because an inference algorithm has changed. The method steps described herein can be implemented on one or more machine learning modules.

What is claimed is:

1. A computer implemented method for evaluating performances of generative models, comprising:
   receiving data describing observations associated with observable variables of a first generative model and a second generative model, each of the first and second generative models having information about relationships among one or more variables;
   for at least one observation:
   applying the first generative model to the observation to produce a first assessment of the observation;
   applying the second generative model to the observation to produce a second assessment of the observation; and
   determining, using one or more processors, a similarity score between the first and second assessments; and
   outputting a subset of the observations, each corresponding to first and second assessments having a similarity score that is less than a predetermined threshold.

2. The method of claim 1, wherein:
   the information about relationships among the one or more variables of the first generative model comprises information about relationships among first hidden variables and first observable variables; and
   the information about relationships among the one or more variables of the second generative model comprises information about relationships among second hidden variables and second observable variables.

3. The method of claim 2, wherein:
   the first generative model includes a first set of clusters, each cluster of the first set including one or more of the first observable variables and one or more of the first hidden variables, the first observable variables being represented as terminal nodes and the first hidden variables being represented as cluster nodes; and
   the second generative model includes a second set of clusters, each cluster of the second set including one or more of the second observable variables and one or more of the second hidden variables, the second observable variables being represented as terminal nodes and the second hidden variables being represented as cluster nodes,
   wherein the terminal nodes and cluster nodes are coupled together by weighted links, so that when an incoming link from a node is activated, a cluster node may be caused to activate with a probability proportional to the weight of the incoming link, and wherein an outgoing link from the cluster node to another node causes the other node to activate with a probability proportionate to the weight of the outgoing link, otherwise the other node is not activated.

4. The method of claim 3, wherein:
   applying the first generative model to the observation includes applying the first generative model to one or more observable variables of the observation to identify, as the first assessment, a first proper subset of clusters of the first set of clusters;
   applying the second generative model to the observation includes applying the second generative model to the one or more observable variables of the observation to identify, as the second assessment, a second proper subset of clusters of the second set of clusters; and
   determining the similarity score between the first and second assessments includes determining a similarity between the first proper subset and the second proper subset.

5. The method of claim 4, wherein applying the first generative model to one or more observable variables of the observation to identify, as the first assessment, a first proper subset of clusters of the first set of clusters includes:
   identifying cluster nodes of the first set of clusters that have been activated in response to applying the first generative model to the one or more observable variables; and
   identifying, as the first subset of clusters, clusters of the first set that include the cluster nodes that have been activated.

6. The method of claim 4, wherein determining a similarity between the first proper subset and the second proper subset includes:
   mapping the first proper subset of clusters to a first smooth distribution;
   mapping the second proper subset of clusters to a second smooth distribution; and
   determining the similarity based on the first smooth distribution and the second smooth distribution.

7. The method of claim 4, wherein:
   each cluster corresponds to a topic;
   the observation includes a document having a set of terms;
   each observable variable corresponds to a term of the document;
   the first assessment includes a first set of topics represented by the first proper subset of clusters; and
   the second assessment includes a second set of topics represented by the second proper subset of clusters.

8. The method of claim 1, further comprising:
- training the first generative model using a first set of training documents;
- training the second generative model using a second different set of training documents; and
- the second generative model is an updated version of the first generative model.

9. The method of claim 1, further comprising sending the first and second assessments corresponding to the subset of observations to a human evaluator.

10. A system, comprising:
- a data processing apparatus;
- a memory storage apparatus in data communication with the data processing apparatus, the memory storage apparatus storing instructions executable by the data processing apparatus and that upon such execution cause the data processing apparatus to perform operations comprising:
  - receiving data describing observations associated with observable variables of a first generative model and a second generative model, each of the first and second generative models having information about relationships among one or more variables;
  - for at least one observation:
    - applying the first generative model to the observation to produce a first assessment of the observation;
    - applying the second generative model to the observation to produce a second assessment of the observation; and
    - determining, using one or more processors, a similarity score between the first and second assessments; and
  - outputting a subset of the observations, each corresponding to first and second assessments having a similarity score that is less than a predetermined threshold.

11. The system of claim 10, wherein:
- the information about relationships among the one or more variables of the first generative model comprises information about relationships among first hidden variables and first observable variables; and
- the information about relationships among the one or more variables of the second generative model comprises information about relationships among second hidden variables and second observable variables.

12. The system of claim 11, wherein:
- the first generative model includes a first set of clusters, each cluster of the first set including one or more of the first observable variables and one or more of the first hidden variables, the first observable variables being represented as terminal nodes and the first hidden variables being represented as cluster nodes; and
- the second generative model includes a second set of clusters, each cluster of the second set including one or more of the second observable variables and one or more of the second hidden variables, the second observable variables being represented as terminal nodes and the second hidden variables being represented as cluster nodes, wherein the terminal nodes and cluster nodes are coupled together by weighted links, so that when an incoming link from a node is activated, a cluster node may be caused to activate with a probability proportional to the weight of the incoming link, and wherein an outgoing link from the cluster node to another node causes the other node to activate with a probability proportionate to the weight of the outgoing link, otherwise the other node is not activated.

13. The system of claim 12, wherein:
- applying the first generative model to the observation includes applying the first generative model to one or more observable variables of the observation to identify, as the first assessment, a first proper subset of clusters of the first set of clusters;
- applying the second generative model to the observation includes applying the second generative model to the one or more observable variables of the observation to identify, as the second assessment, a second proper subset of clusters of the second set of clusters; and
- determining the similarity score between the first and second assessments includes determining a similarity between the first proper subset and the second proper subset.

14. The system of claim 13, wherein applying the first generative model to one or more observable variables of the observation to identify, as the first assessment, a first proper subset of clusters of the first set of clusters includes:
- identifying cluster nodes of the first set of clusters that have been activated in response to applying the first generative model to the one or more observable variables; and
- identifying, as the first subset of clusters, clusters of the first set that include the cluster nodes that have been activated.

15. The system of claim 13, wherein determining a similarity between the first proper subset and the second proper subset includes:
- mapping the first proper subset of clusters to a first smooth distribution;
- mapping the second proper subset of clusters to a second smooth distribution; and
- determining the similarity based on the first smooth distribution and the second smooth distribution.

16. The system of claim 13, wherein:
- each cluster corresponds to a topic;
- the observation includes a document having a set of terms;
- each observable variable corresponds to a term of the document;
- the first assessment includes a first set of topics represented by the first proper subset of clusters; and
- the second assessment includes a second set of topics represented by the second proper subset of clusters.

17. The system of claim 10, wherein the instructions upon execution cause the data processing apparatus to perform further operations comprising:
- training the first generative model using a first set of training documents;
- training the second generative model using a second different set of training documents; and
- the second generative model is an updated version of the first generative model.

18. The system of claim 10, further comprising sending the first and second assessments corresponding to the subset of observations to a human evaluator.

19. A non-transitory computer storage medium encoded with a computer program, the program comprising instructions that when executed by a data processing apparatus cause the data processing apparatus to perform operations comprising:
- receiving data describing observations associated with observable variables of a first generative model and a second generative model, each of the first and second generative models having information about relationships among one or more variables;
- for at least one observation:
  - applying the first generative model to the observation to produce a first assessment of the observation;

applying the second generative model to the observation to produce a second assessment of the observation; and determining, using one or more processors, a similarity score between the first and second assessments; and outputting a subset of the observations, each corresponding to first and second assessments having a similarity score that is less than a predetermined threshold.

20. The non-transitory computer storage medium of claim 19, wherein:

the information about relationships among the one or more variables of the first generative model comprises information about relationships among first hidden variables and first observable variables; and the information about relationships among the one or more variables of the second generative model comprises information about relationships among second hidden variables and second observable variables.

* * * * *